March 29, 1966 E. VALENTE 3,243,155
CONTROL UNIT FOR COFFEE MACHINE
Filed July 7, 1965
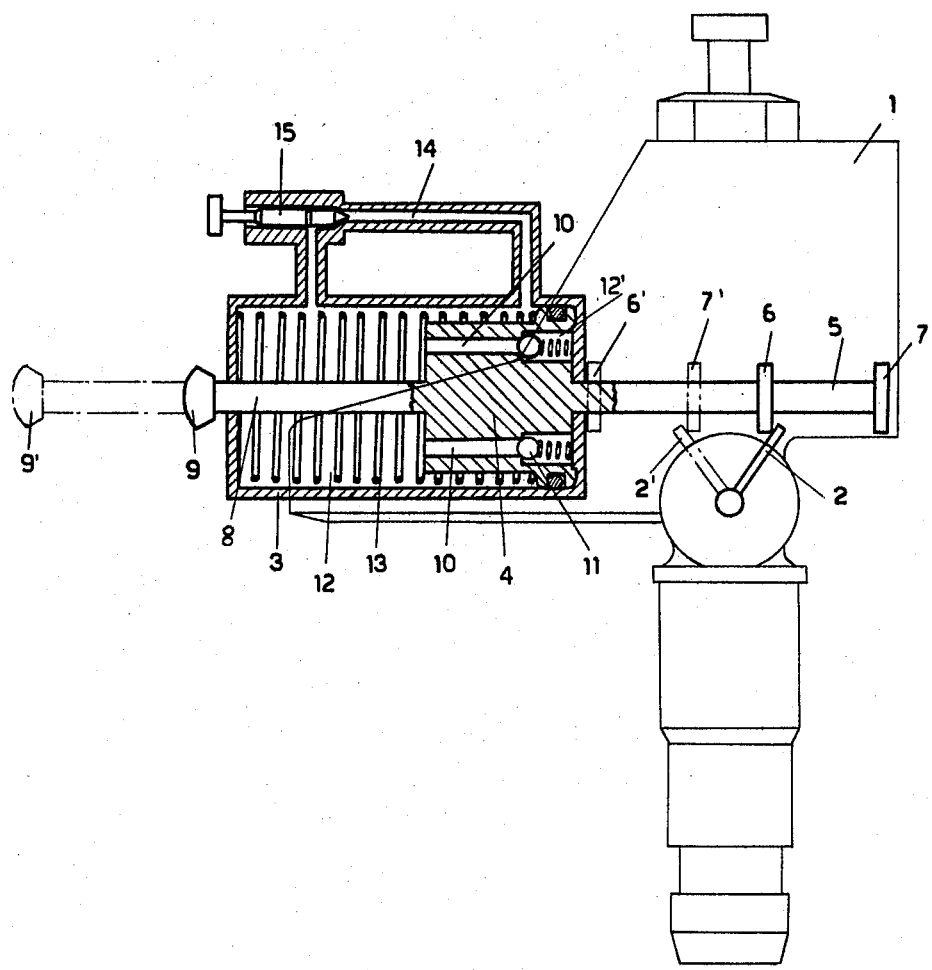
INVENTOR
Ernesto VALENTE

3,243,155
CONTROL UNIT FOR COFFEE MACHINE
Ernesto Valente, Via G. Ventura 5, Milan, Italy
Filed July 7, 1965, Ser. No. 473,893
2 Claims. (Cl. 251—54)

This application is a continuation-in-part of my application Serial No. 188,154, filed April 17, 1962, now abandoned and relates generally to coffee making machines and more particularly to an infusion control delivery unit for coffee making machines.

Flow-control valves or delivery units in coffee making machines for dispensing of coffee and controlling an infusion of water through a dosage of coffee, for example powdered coffee, are generally manually operated and as a consequence if the valve is not closed after filling of coffee cups, the operator may find that the valve has been partially left open so that there is spillage. Delivery unit control valves have been made for coffee machines intending to overcome this problem of having to manually close the coffee delivery valve and to overcome the inadvertent leaving of the valve open by an operator. These delivery control units generally are constructed to open and close the valve through a controlled operating lever. The control units are timed units in which the timing function is controlled by a piston which generally works against a given air pressure. The time during which the valve remains open and is closed is regulated generally by a needle valve in the unit which controls the exhaustion of the control air in the control unit.

It is a principal object of the present invention to provide a new and improved dispensing and infusion control unit for coffee machines, Another object of the present invention is to provide a new and improved coffee machine control unit which is easier to manufacture and operate than those heretofore known.

A feature of the control delivery unit for coffee machines according to the invention is the provision of a rotary flow-control valve for controlling the infusion of water and dispensing of the coffee and operable to an open position by an operating lever. The unit is provided with a cylindrical container adapted to contain liquid and to function as a hydraulic cylinder. A piston is slidably and sealingly disposed in the cylinder and is biased by a spring toward one end of the cylinder. The unit comprises a first piston rod connected to the piston and projecting out of one end of the cylinder. This piston rod has an operating knob or operator at its outer end for manually operating the piston in a direction opposite to the action of the biasing spring.

A second piston rod is connected to the piston and projects out of the other or opposite end of the cylinder. This second rod has two axially spaced-apart stops. The operating lever of the rotary flow-control valve is positioned between the stops and is engaged by the stops alternately upon reciprocation of the piston.

The biasing spring is disposed internally of the hydraulic cylinder between the piston and the end of the cylinder through which the first piston rod projects. Means are provided on the unit defining a passageway exteriorily of the hydraulic cylinder but communicating with both ends of the cylinder. Within this passageway is provided valve means for variably regulating the flow of liquid through the passageway. The piston itself is provided with at least one passageway extending through the piston to allow fluid-flow from one side of the piston toward an opposite side thereof. This passageway is provided with a one-way check valve for allowing flow of fluid through the passageway only in a direction toward the end of the cylinder through which the second piston rod projects.

Other features and advantages of the control unit in accordance with the present invention will be better understood as described in the following specification and appended claims, in conjunction with the drawing in which a side elevation view of a control unit, partly in section, is illustrated.

As shown in the drawing, a control unit 1 is provided with a rotary flow-control valve for delivery of coffee to individual cups, not shown, and infusion of water to a dosage of coffee, not shown. The rotary flow-control valve comprises a rotary plug, not shown, actuated to an open and closed position by an operating lever 2. The valve is closed when the operating lever is in the position shown in solid lines and is in an open position when the operating lever is in the position shown in broken lines and designated 2'.

The control unit is provided with a hydraulic cylinder 3 which is fluid-filled and in which is reciprocably disposed a piston 4. The piston has a piston rod 5 connected thereto and extending outwardly through one end of the hydraulic cylinder, as illustrated, through a fluid-tight seal in the hydraulic cylinder 3. This piston rod is provided with two axially spaced-apart stops 6, 7 between which the free end of operator or lever 2 is disposed. The stops actuate the operating lever 2 of the valve for operating the rotary flow-control valve to a closed and an open position. When the stops are in the position illustrated in solid lines, the valve is closed as heretofore described and when the force of the stops are in the position shown in broken lines 6', 7' the operator 2 is thrown to the position 2' in which the valve is opened.

In order to open the valve when making coffee a piston rod 8 is provided on the opposite side of the piston 4 and extends through the opposite end of the hydraulic cylinder 3 as illustrated. The free end of the piston rod 8 is provided with a manually operated operator or knob 9. In order to open the valve, the knob 9 is actuated to the "open" position shown in broken lines 9'. Since the hydraulic cylinder 3 is fluid-filled, provision is made in the piston for allowing fluid to flow from the left-hand side of the piston to the right-hand side as the piston is manually actuated. Thus, passageways 10 connect the opposite sides of the piston 4 and one-way check valves 11, normally seated in the position in which the valve is shown, allow fluid-flow from chamber 12 of the cylinder to the opposite end or chamber 12' of the cylinder 3 as the piston 4 is moved toward the left when the knob 9 is actuated to the position 9'.

When the piston 4 is manually actuated toward the left, it is moved against the action of a biasing spring 13 constantly biasing the piston 4 toward the end of the hydraulic cylinder through which the piston rod 5 extends and toward a position corresponding to the closed position of the valve 2.

Provision is made in the control unit according to the invention for setting or timing the closing of the rotary flow-control valve. This is accomplished by means exteriorly of the hydraulic cylinder but defining a passageway 14 in communication with the interior chamber 12, the cylinder casing as illustrated. It can be seen that 12' of the piston cylinder 13 formed by the piston and once the piston has been moved to its left most position the biasing spring biases the piston toward the right to restore it to the position in which it is shown. Thus the one-way check valves 11 with seat and fluid flow from the end 12' of the piston will be through the passageway 14 and into the space or chamber 12. A regulating needle valve 15 is provided in the passageway 14 to variably control flow of the hydraulic fluid in the passageway 14 thereby to variably set the closing of the valve.

Thus, once the piston has been actuated for actuating the flow-control valve to the left or an open position the beverages or coffee can be made. However, the plunger 12 tends to move toward the right under the action of the biasing spring compelling the fluid in the right hand chamber to move toward the left through conduit 14 under the control of the needle valve 15. At a certain point of travel of the piston the stop or collar engages the lever 2 carrying the same along with it until both are in the positions 2, 6 at which point the cut-off or flow-control valves closes and the making of coffee ceases.

Those skilled in the art can readily understand that the control time is a function of the force of the springs 13 and of setting of the needle valve 15 and may be easily and obviously variably adjusted. The fluid or hydraulic circuit remains unaltered and is a closed circuit providing the accurate control at all times.

While a preferred embodiment of the invention has been shown and described, it will be understood that many modifications and changes can be made within the true spirit and scope of the invention.

What I claim and desire to secure by Letters Patent is:

1. In a control delivery unit for coffee making machines having a rotary flow-control valve for controlling the dispensing of coffee, in combination, a lever for operating said rotary flow-control valve of said unit, a fluid-filled cylindrical container adapted to contain liquid and to function as a hydraulic cylinder, a piston slidably and sealingly disposed in said cylinder, a biasing spring constantly biasing said piston toward one end of said cylinder, a first piston rod connected to said piston and projecting out of one end of said cylinder, said piston rod having a knob at its outer end for actuating said piston in a direction opposite to the biasing spring, a second piston rod connected to the piston and projecting out of the other end of said cylinder, said second rod having two axially spaced-apart stops, said lever being positioned between said stops to be engaged by said stops alternately upon reciprocation of said piston, said biasing spring being disposed between said piston and the end of said cylinder through which said first piston rod projects, means defining a passageway exteriorly of said cylinder in communication with both ends of said cylinder, and valve means for variably regulating the flow of liquid through said passageway, at least one piston passageway extending through said piston to allow fluid flow from one side of said piston toward an opposite side thereof, a check valve in said piston passageway for allowing flow of fluid through said passageway only in a direction toward said other end of said cylinder through which said second piston rod projects.

2. In a control delivery unit for coffee making machines having a rotary flow-control valve for controlling the dispensing of coffee, in combination, a lever for operating said rotary flow-control valve of said unit, a fluid-filled cylindrical container adapted to contain liquid and to function as a hydraulic cylinder, a piston slidably and sealingly disposed in said cylinder, a biasing spring constantly biasing said piston toward one end of said cylinder, a first piston rod connected to said piston and projecting out of one end of said cylinder for actuating said piston in a direction opposite to the biasing spring, a second piston rod connected to the piston and projecting out of the other end of said cylinder, said second rod having two axially spaced-apart portions, said lever being positioned between said portions to be engaged by said portions alternately upon reciprocation of said piston, said biasing spring being disposed between said piston and the end of said cylinder through which said first piston rod projects, means defining a passageway exteriorly of said cylinder in communication with both ends of said cylinder, and valve means for variably regulating the flow of liquid through said passageway, at least one piston passageway extending through said piston to allow fluid flow from one side of said piston toward an opposite side thereof, a check valve in said piston passageway for allowing flow of fluid through said passageway only in a direction toward said other end of said cylinder through which said second piston rod projects.

No references cited.

ISADOR WEIL, *Primary Examiner.*

D. LAMBERT, *Assistant Examiner.*